United States Patent
Kwon et al.

(10) Patent No.: US 9,639,357 B2
(45) Date of Patent: May 2, 2017

(54) PROCESSOR, APPARATUS AND METHOD FOR GENERATING INSTRUCTIONS

(71) Applicant: Samsung Electronics Co., Ltd., Suwon-si (KR)

(72) Inventors: Ki-Seok Kwon, Seoul (KR); Jae-Un Park, Seoul (KR); Suk-Jin Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 900 days.

(21) Appl. No.: 13/690,079

(22) Filed: Nov. 30, 2012

(65) Prior Publication Data

US 2013/0145133 A1 Jun. 6, 2013

(30) Foreign Application Priority Data

Dec. 2, 2011 (KR) .................. 10-2011-0128591

(51) Int. Cl.
*G06F 7/38* (2006.01)
*G06F 9/00* (2006.01)
*G06F 9/30* (2006.01)

(52) U.S. Cl.
CPC ........ *G06F 9/3004* (2013.01); *G06F 9/30043* (2013.01)

(58) Field of Classification Search
None
See application file for complete search history.

(56) References Cited

U.S. PATENT DOCUMENTS

| | | | | |
|---|---|---|---|---|
| 6,199,155 B1 * | 3/2001 | Kishida et al. | ............... | 712/210 |
| 6,314,501 B1 * | 11/2001 | Gulick | ...................... | G06F 9/54 |
| | | | | 711/153 |
| 6,578,118 B1 * | 6/2003 | Raza | ........................ | G06F 5/10 |
| | | | | 370/382 |
| 7,016,349 B1 * | 3/2006 | Raza | ..................... | H04L 49/901 |
| | | | | 370/390 |
| 7,275,148 B2 | 9/2007 | Moyer et al. | | |
| 7,461,210 B1 * | 12/2008 | Wentzlaff | .............. | G06F 12/126 |
| | | | | 711/120 |

(Continued)

FOREIGN PATENT DOCUMENTS

| | | |
|---|---|---|
| KR | 10-0622945 B1 | 9/2006 |
| KR | 10-1016257 B1 | 2/2011 |
| KR | 10-1031158 B1 | 4/2011 |

*Primary Examiner* — Michael Sun
(74) *Attorney, Agent, or Firm* — NSIP Law

(57) ABSTRACT

A processor, apparatus and method to use a multiple store instruction based on physical addresses of registers are provided. The processor is configured to execute an instruction to store data of a plurality of registers in a memory, the instruction including a first area in which a physical address of each of the registers is written. An instruction generating apparatus is configured to generate an instruction to store data of a plurality of registers in a memory, the instruction including a first area in which a physical address of each of the registers is written. An instruction generating method includes detecting a code area that instructs to store data of a plurality of registers in a memory, from a program code. The instruction generating method further includes generating an instruction corresponding to the code area by mapping physical addresses of the registers to a first area of the instruction.

12 Claims, 7 Drawing Sheets

(56) References Cited

U.S. PATENT DOCUMENTS

| | | |
|---|---|---|
| 7,493,463 B2 | 2/2009 | Paek et al. |
| 7,945,766 B2 | 5/2011 | Yoshida |
| 8,307,193 B2 * | 11/2012 | Sehr .................... G06F 12/1491 711/163 |
| 8,738,860 B1 * | 5/2014 | Griffin et al. ................. 711/122 |
| 9,280,479 B1 * | 3/2016 | Kruckemyer ....... G06F 12/0871 |
| 2004/0019762 A1 * | 1/2004 | Fukuoka et al. .............. 711/203 |
| 2004/0044806 A1 * | 3/2004 | Moll ................... G06F 13/1684 710/3 |
| 2005/0193169 A1 * | 9/2005 | Ahluwalia ................... 711/115 |
| 2006/0010262 A1 * | 1/2006 | Fronte ..................... G06F 13/28 710/22 |
| 2007/0254619 A1 * | 11/2007 | Salomone ......... H04W 52/0225 455/343.2 |
| 2009/0070552 A1 * | 3/2009 | Kanstein et al. ............... 712/29 |
| 2009/0276432 A1 | 11/2009 | Hokenek et al. |
| 2010/0058001 A1 * | 3/2010 | Akaike ................... G06F 12/10 711/147 |
| 2010/0077156 A1 * | 3/2010 | Mochida ............... G06F 13/368 711/148 |
| 2011/0149960 A1 * | 6/2011 | Fernandez Gutierrez ............................. H04L 12/18 370/390 |

\* cited by examiner

PROCESSOR, APPARATUS AND METHOD FOR GENERATING INSTRUCTIONS

CROSS-REFERENCE TO RELATED APPLICATION

This application claims the benefit under 35 U.S.C. §119(a) of a Korean Patent Application No. 10-2011-0128591, filed on Dec. 2, 2011, in the Korean Intellectual Property Office, the entire disclosure of which is incorporated herein by reference for all purposes.

BACKGROUND

1. Field

The following description relates to a processor configured to execute a store instruction that stores data of a register in a memory, and an apparatus and method to generate the store instruction.

2. Description of the Related Art

A general-purpose microprocessor uses instructions to copy data between registers and a memory. An operation of storing values contained in a register into a memory is called "store", and an operation of storing values stored in a memory into a register is called "load". Each of basic "load" and "store" instructions can select and use a single memory address and a single register entry.

However, some processors additionally use instructions that can select and use a plurality of register entries and a plurality of successive instructions. Such an instruction is called a multiple store instruction. Using such a multiple store instruction may reduce the number of load and store instructions that may be often used upon calling functions and returning from functions, thereby reducing the length of a program code.

In order to execute a multiple store instruction, target registers, that is, registers containing data that is to be stored in a memory, have to be designated. A general multiple store instruction may designate registers based on register numbers or a register list. Designating target registers based on register numbers or a register list may require a process of converting the register numbers to addresses every cycle. This process may be implemented using a leading one detector and an additional circuit, which may make a critical path in an instruction decoder, reducing the operation speed of the processor or increasing the number of pipeline stages.

SUMMARY

In one general aspect, there is provided a processor configured to execute an instruction to store data of a plurality of registers in a memory, the instruction including a first area in which a physical address of each of the registers is written.

The instruction further includes a second area storing a physical address of a register that stores a start address of the memory from which the data of the registers is to be stored.

The instruction further includes a first sub instruction including the first area and the second area, and a second sub instruction including the first area.

The instruction further includes a first sub instruction including the first area and a second area storing a start address of the memory from which the data of the registers is to be stored, and a second sub instruction including the first area.

The processor includes a reconfigurable processor.

The reconfigurable processor includes a processor based on a very long instruction word (VLIW) or coarse-grained array (CGA) architecture.

In another general aspect, there is provided an instruction generating apparatus configured to generate an instruction to store data of a plurality of registers in a memory, the instruction including a first area in which a physical address of each of the registers is written.

The instruction further includes a second area storing a physical address of a register that stores a start address of the memory from which the data of the registers is to be stored.

The instruction further includes a first sub instruction including the first area and the second area, and a second sub instruction including the first area.

The instruction further includes a first sub instruction including the first area and a second area storing a start address of the memory from which the data of the registers is to be stored, and a second sub instruction including the first area.

The instruction generating apparatus is further configured to detect a code area that instructs to store the data of the registers in the memory, from a program code.

The instruction generating apparatus is further configured to generate the instruction corresponding to the code area by mapping the physical address of each of the registers to the first area.

The instruction generating apparatus is further configured to generate the instruction by mapping a start address of the memory from which the data of the registers is to be stored, to a second area of the instruction.

In yet another general aspect, there is provided an instruction generating method including detecting a code area that instructs to store data of a plurality of registers in a memory, from a program code. The instruction generating method further includes generating an instruction corresponding to the code area by mapping physical addresses of the registers to a first area of the instruction.

The generating of the instruction further includes mapping a physical address of a register that stores a start address of the memory from which the data of the registers is to be stored, to a second area of the instruction.

The instruction further includes a first sub instruction including the first area and the second area, and a second sub instruction including the first area.

The generating of the instruction further includes mapping a start address of the memory from which the data of the registers is to be stored, to a second area of the instruction.

The instruction further includes a first sub instruction including the first area and the second area, and a second sub instruction including the first area.

In yet another general aspect, there is provided an instruction generating method including generating an instruction to store data of a plurality of registers in a memory such that the instruction includes physical addresses of the registers.

The generating of the instruction further includes generating the instruction such that the instruction includes one of a start address of the memory from which the data of the registers is to be stored and a physical address of a register that stores the start address.

Other features and aspects will be apparent from the following detailed description, the drawings, and the claims.

Figure 1:
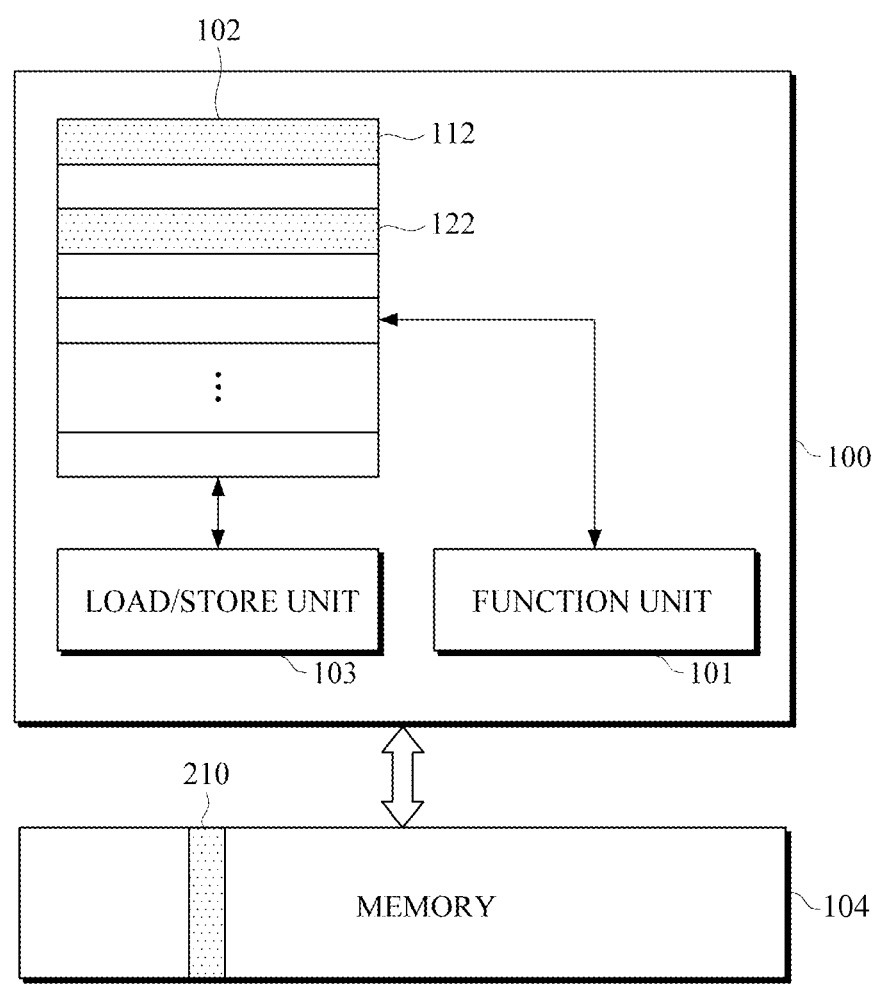
FIG. 1 is a diagram illustrating an example of a processor.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating an example of a processor 100. For example, the processor 100 may be a reconfigurable processor. In another example, the processor 100 may be a processor based on a very long instruction word (VLIW) architecture or a coarse grained array (CGA) architecture. However, these processors are only examples, and other processors may be used depending on the situation.

The processor 100 may include a function unit 101, a register file 102, and a load/store unit 103. The function unit 101 may perform various arithmetic and logic operations. The register file 102 may include a plurality of registers. The function unit 101 may receive instructions or data needed for various operations from the register file 102. Results of calculations by the function unit 101 may be stored in the register file 102.

The load/store unit 103 may store or copy data stored in a register of the register file 102 into an external memory 104 of the processor 100. The operation of storing or copying data stored in a register of the register file 102 into the external memory 104 is called "store". Also, the load/store unit 103 may store or copy data stored in the memory 104 into a register of the register file 102. The operation of storing or copying data stored in the memory 104 into a register of the register file 102 is called "load".

According to an example, the processor 100 may execute a multiple store instruction. The multiple store instruction may include an instruction to store individual pieces of data stored in a plurality of registers into an area of a memory. "Multiple storing" refers to the operation of storing individual pieces of data stored in a plurality of registers into an area of a memory when a multiple store instruction is executed. For example, a multiple store instruction may include an instruction to store data stored in a register #0 112 and a register #2 122 successively into an area 210 of the memory 104.

According to another example, a multiple store instruction executed by the processor 100 may include an address area that includes physical addresses of registers. For example, the processor 100 may execute an instruction to store data stored in a plurality of registers (e.g., target registers) into a memory, the instruction including an address area in which physical addresses of the registers are written. In other words, the multiple store instruction may include the address area that designates the target registers and stores the physical addresses of the target registers, instead of solely numbers or a list of the target registers.

Figure 2:
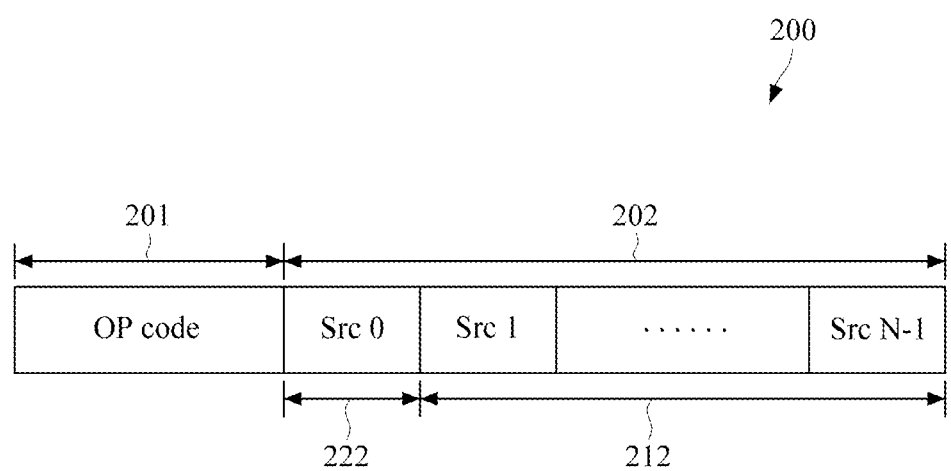
FIG. 2 is a diagram illustrating an example of a structure of a multiple store instruction.

FIG. 2 is a diagram illustrating an example of a structure of a multiple store instruction 200. The multiple store instruction 200 may include an op code area 201 and an address area 202. The op code area 201 may correspond to a meaning of the multiple store instruction 200. For example, a multiple store instruction to store data of a register into a memory may be mapped to the op code area 201.

The address area 202 may include a first area 212 and a second area 222. The first and second areas 212 and 222 may store physical addresses of different registers, respectively. The first area 212 may store the physical addresses of target registers upon multiple storing, and the second area 222 may store the physical address of another register that designates a start address of areas of a memory in which data of the target registers will be stored. A number of fields included in the first area 212 is not limited.

For example, the multiple store instruction 200 may include a multiple store instruction to store data of registers #1, #4, and #3 successively into areas of a memory, starting from a start address 0x00010000 of the memory. Here, the start address may be stored in a register #15. In this case, a physical address of the register #1 may be stored in Src 1 of the first area 212, a physical address of the register #4 may be stored in Src2 of the first area 212, and a physical address of the register #3 may be stored in Src 3 of the first area 212. Also, a physical address of the register #15 that stores the start address may be written in Src0 of the second area 222. In other words, the load/store unit 103 of FIG. 1 may multiple-store, when receiving the multiple store instruction 200, the data of the registers #1, #4, and #3 in the areas of the memory starting from the start address.

Figure 3:
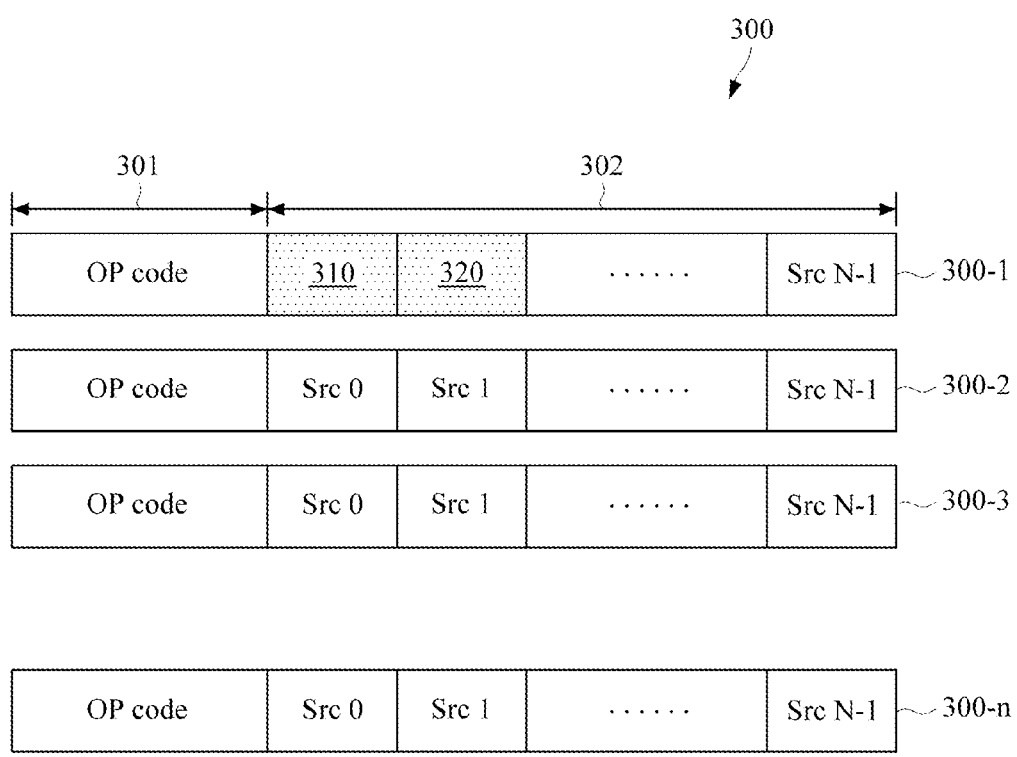
FIG. 3 is a diagram illustrating another example of a structure of a multiple store instruction.

FIG. 3 is a diagram illustrating another example of a structure of a multiple store instruction 300. The multiple store instruction 300 may include a plurality of sub instructions 300-1, . . . , 300-n. Each of the sub instructions 300-1, . . . , 300-n may include an op code area 301 and an address area 302, like the example of FIG. 2. In FIG. 3, a number of the sub instructions 300-1, . . . , 300-n is not limited. Also, a number of fields included in the address area 202 of each of the sub instructions 300-1, . . . , 300-n is not limited.

According to an example, one or more (in the current example, the sub instruction 300-1) of the sub instructions 300-1, . . . , 300-n may include a memory address area 310 and an option area 320 in the address area 302. The memory address area 310 may store a start address of areas in a memory in which data of target registers will be stored, or a physical address of another register that stores the start address. The option area 320 may store various setting information.

Figure 4:
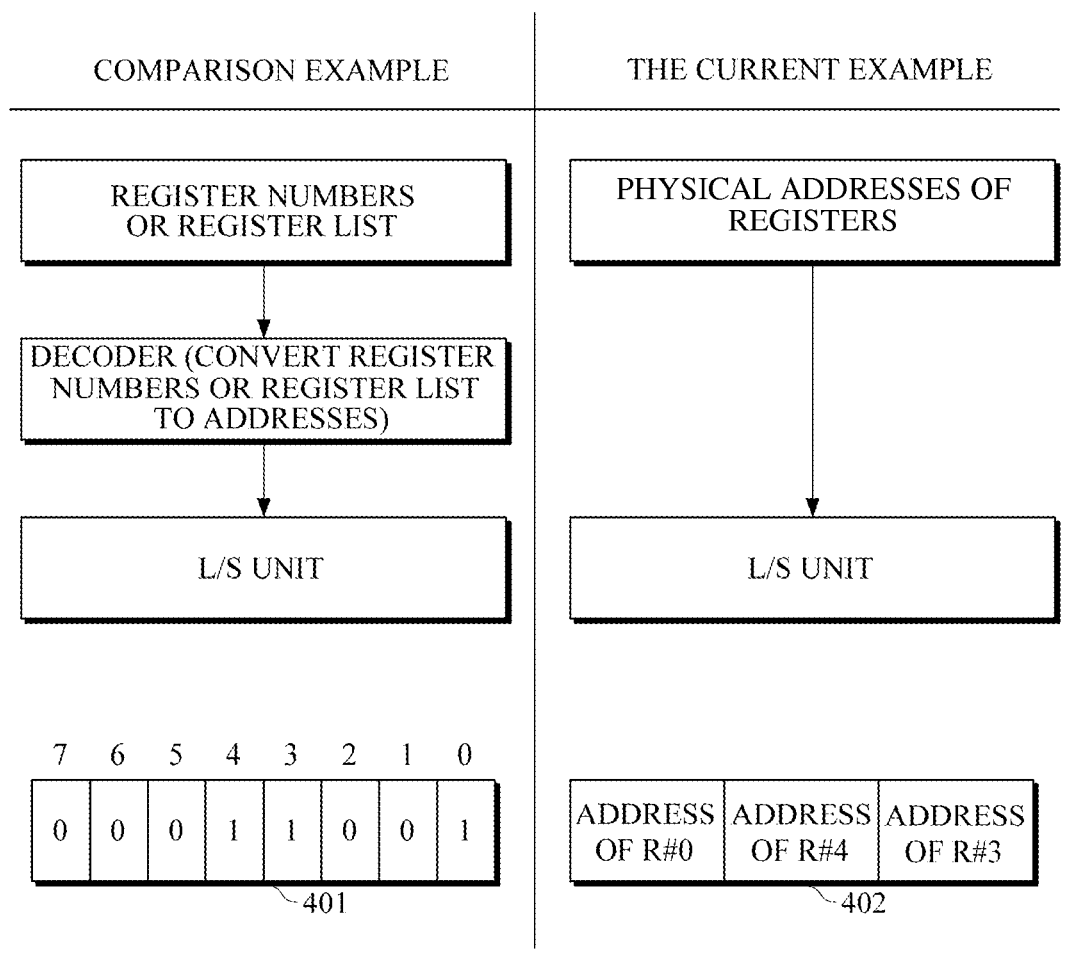
FIG. 4 is a diagram illustrating results of a comparison between a multiple store instruction based on physical addresses of registers and a multiple store instruction based on register numbers.

FIG. 4 is a diagram illustrating results of a comparison between a multiple store instruction based on physical addresses of registers and a multiple store instruction based on register numbers. In more detail, the diagram illustrates two methods, each of which includes a multiple store instruction designating target registers including data that is to be stored in a memory. The first method (a comparison example) includes designation of target registers using register numbers or a register list, while the second method (a current example) may include designation of target registers using physical addresses of the target registers. These methods will be compared to each other, as follows. For example, in a system having 8 registers #0 through #7, a case of designating registers #0, #4, and #3 in order to multiple-store data of the registers #0, #4, and #3 is assumed.

In the comparison example, each bit of a register list 401 of a multiple store instruction corresponds to an entry of a register. For example, to designate the registers #0, #4, and #3, respective bits #0, #4, and #3 of the register list 401 are set to 1. Accordingly, in order for a load/store unit (for example, 103 of FIG. 1) to access the registers #0, #4, and #3, the load/store unit needs a decoder to convert the register list 401 to addresses of the registers #0, #4, and #3. Also, since three registers #0, #4, and #3 are designated, decoding requires at least three cycles.

However, in the current example, each field of an address area 402 of a multiple store instruction may directly correspond to a physical address of a register. For example, to designate the registers #0, #4, and #3, respective fields of the address area 402 may include the physical addresses of the registers #0, #4, and #3. Accordingly, a load/store unit may directly use the physical addresses designated in the corresponding multiple store instruction without having to perform decoding.

Figure 5:
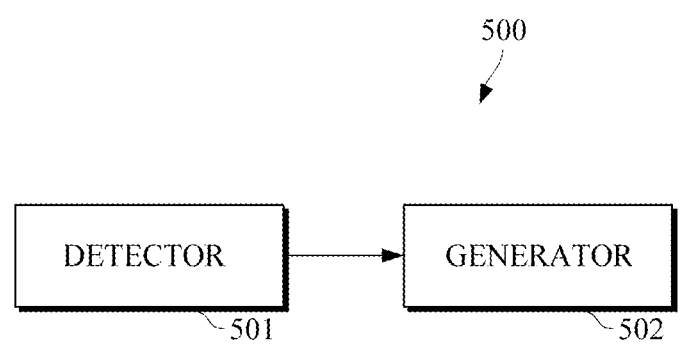
FIG. 5 is a diagram illustrating an example of an instruction generating apparatus.
Figure 6:
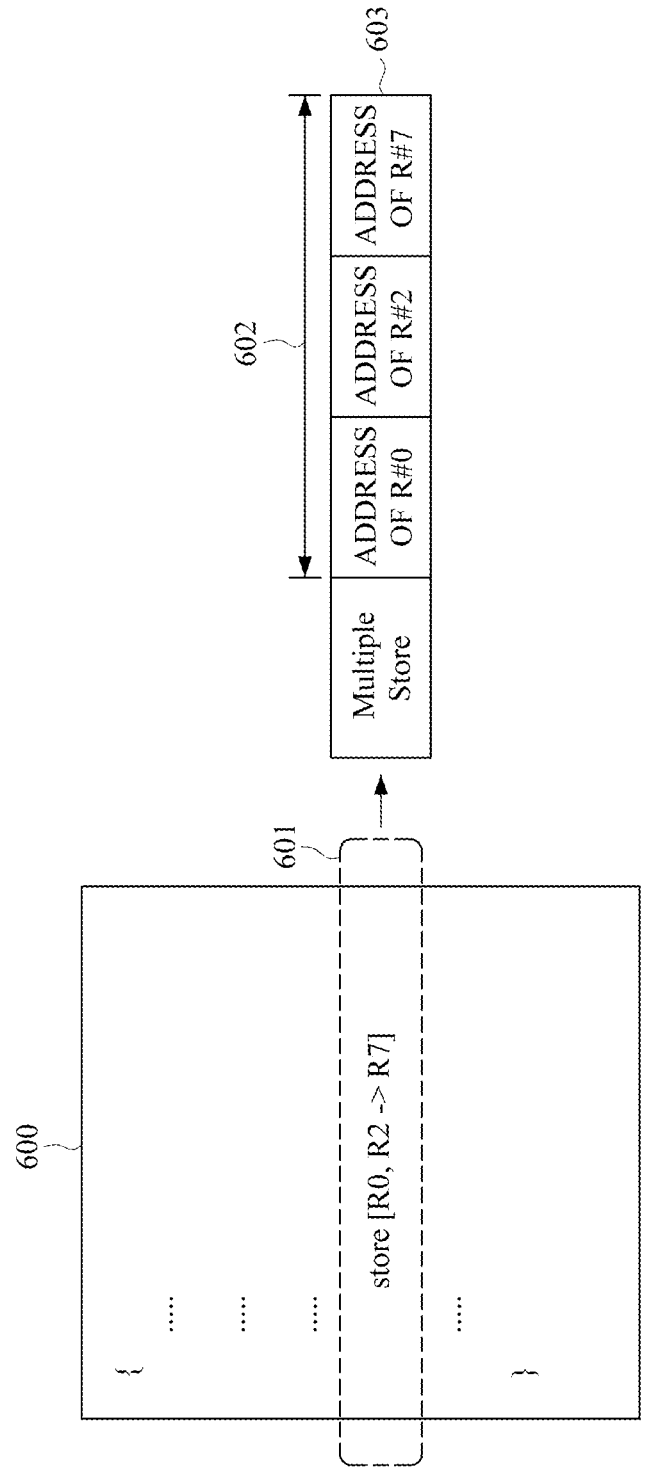
FIG. 6 is a diagram illustrating an operation of the instruction generating apparatus.

FIG. 5 is a diagram illustrating an example of a multiple store instruction generating apparatus 500, and FIG. 6 is a diagram illustrating an operation of the multiple store instruction generating apparatus 500 illustrated in FIG. 5. The multiple store instruction generating apparatus 500 may be a compiler corresponding to the processor 100 illustrated in FIG. 1. However, the compiler is only an example, and the multiple store instruction generating apparatus 500 is not limited to a compiler.

Referring to FIG. 5, the multiple store instruction generating apparatus 500 may include a detector 501 and a generator 502. Each of the detector 501 and the generator 502 may be implemented as hardware installed inside or outside a general-purpose processor (for example, the processor 100 of FIG. 1), or as software that is executed in the processor 100. Also, in examples, the detector 501 and generator 502 may be integrated, and a portion of functions that are performed by any one of the detector 501 and generator 502 may be performed by the other one or both of the detector 501 and generator 502.

The detector 501 may detect a code area instructing to store data of a plurality of registers in a memory, from a program code. For example, as illustrated in FIG. 6, the detector 501 may detect a portion 601 that is to be subject to multiple storing, from a source code 600. The portion 601 may include a code area instructing to "store data stored in registers R0 and R2 successively using a memory address stored in a register R7 as a start address".

Referring back to FIG. 5, the generator 502 may generate a multiple store instruction corresponding to the detected code area by mapping physical addresses of the individual registers (e.g., the registers R0 and R2) to a first area of the multiple store instruction. Also, the generator 502 may map a start address of areas of a memory in which data of the registers will be stored, or a physical address of a register (e.g., the register R7) storing the start address, to a second area of the multiple store instruction. For example, as illustrated in FIG. 6, the generator 502 may generate a multiple store instruction 603 having a predetermined address area 602. In more detail, the generator 502 may generate the multiple store instruction 603 by mapping physical addresses of registers R0, R2, and R7 to the address area 602.

Figure 7:
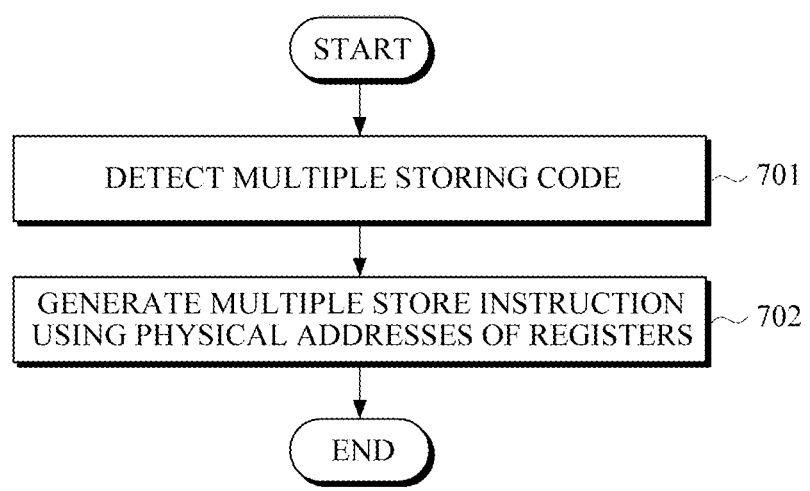
FIG. 7 is a flowchart illustrating an example of an instruction generating method.

FIG. 7 is a flowchart illustrating an example of a multiple store instruction generating method. At step 701, a multiple storing code is detected from a program code. The multiple storing code may include an instruction code or code area instructing to store data of a plurality of registers in a memory. For example, the detector 501 of FIG. 5 may detect the portion 601 shown in FIG. 6 as the multiple storing code.

At step 702, a multiple store instruction is generated using physical addresses of the individual registers. For example, the generator 501 of FIG. 5 may generate a multiple store instruction (for example, 603 of FIG. 6) having an address area that stores the physical addresses of the individual registers.

As such, according to the examples described above, there is provided a processor, apparatus, and method to generate a multiple store instruction that designates target registers using their physical addresses, which may be applied even to the case where a number of entries of register files is large. Also, it may be possible to arbitrarily select an order in which values of the target registers are stored in corresponding areas of a memory. For example, it may be possible to store the values of the target registers in the order of a first register, a third register, and a seventh register, in the order of the third register, the first register, and the seventh register, or in an arbitrary order of the target registers.

Furthermore, according to the examples described above, there is provided a processor, apparatus, and method to execute the multiple store instruction, which may include decoding the multiple store instruction including the physical addresses of the target registers and reading the values of the target registers. Accordingly, no additional circuit (e.g., a decoder) that calculates the physical addresses of the target registers may be needed. As such, a processor having a high operating frequency may be implemented with a small number of pipeline stages. In addition, since the target register values may be read at once, when a plurality of load/store units are provided, a time of multiple storing may be reduced.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors. As used herein, a processing device configured to implement a function A includes a processor programmed to run specific software. In addition, a processing device configured to implement a function A, a function B, and a function C may include configurations, such as, for example, a processor configured to implement both functions A, B, and C, a first processor configured to implement function A, and a second processor configured to implement functions B and C, a first processor to implement function A, a second processor configured to implement function B, and a third processor configured to implement function C, a first processor configured to implement function A, and a second processor configured to implement functions B and C, a first processor configured to implement functions A, B, C, and a second processor configured to implement functions A, B, and C, and so on.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A processor for executing an instruction, comprising:
a plurality of registers; and
a store unit configured to store data stored in the plurality of registers into an external memory by executing a multiple store instruction,
wherein the multiple store instruction comprises
a first address area indicating a plurality of physical addresses corresponding to the plurality of registers respectively, and
a second address area indicating a physical address of a register that stores a start address of the external memory in which the data is to be stored.

2. The processor of claim 1, wherein the multiple store instruction further comprises a first sub instruction comprising the first address area and the second address area, and a second sub instruction comprising the first address area.

3. The processor of claim 1, wherein the processor comprises a reconfigurable processor.

4. The processor of claim 3, wherein the reconfigurable processor comprises a processor based on a very long instruction word (VLIW) or coarse-grained array (CGA) architecture.

5. An instruction generating apparatus for generating a multiple store instruction to store data of a plurality of registers included in a processor in an external memory, the multiple store instruction comprising:
a first address area indicating a plurality of physical addresses corresponding to the plurality of registers respectively; and
a second address area indicating a physical address of a register that stores a start address of the external memory in which data of the plurality of registers is to be stored.

6. The instruction generating apparatus of claim 5, wherein the multiple store instruction further comprises a first sub instruction comprising the first address area and the second address area, and a second sub instruction comprising the first address area.

7. The instruction generating apparatus of claim 5, wherein the instruction generating apparatus is further configured to detect a code area that instructs to store the data of the plurality of registers in the external memory, from a program code.

8. The instruction generating apparatus of claim 7, wherein the instruction generating apparatus is further configured to generate the multiple store instruction corresponding to the code area by mapping the physical address of each of the plurality of registers to the first address area.

9. The instruction generating apparatus of claim 5, wherein the instruction generating apparatus is further configured to generate the multiple store instruction by mapping a start address of the external memory from which the data of the plurality of registers is to be stored, to a second address area of the instruction.

10. An instruction generating method comprising:
detecting a code area that instructs to store data of a plurality of registers included in a processor in an external memory, from a program code; and
generating a multiple store instruction corresponding to the code area by mapping a plurality of physical addresses corresponding to the plurality of registers respectively to a first address area of the instruction and mapping a physical address of a register that stores a start address of the external memory from which the data of the plurality of registers is to be stored, to a second address area of the instruction.

11. The instruction generating method of claim 10, wherein the multiple store instruction further comprises a first sub instruction comprising the first address area and the second address area, and a second sub instruction comprising the first address area.

12. An instruction generating method comprising:
generating a multiple store instruction to store data of a plurality of registers included in a processor in an external memory such that the multiple store instruction comprises a plurality of physical addresses corresponding to the plurality of registers respectively,
wherein the generating of the multiple store instruction further comprises generating the multiple store instruction such that the multiple store instruction comprises one of a start address of the external memory in which the data of the plurality of registers is to be stored and a physical address of a register that stores the start address.

* * * * *